United States Patent Office 2,938,338
Patented May 31, 1960

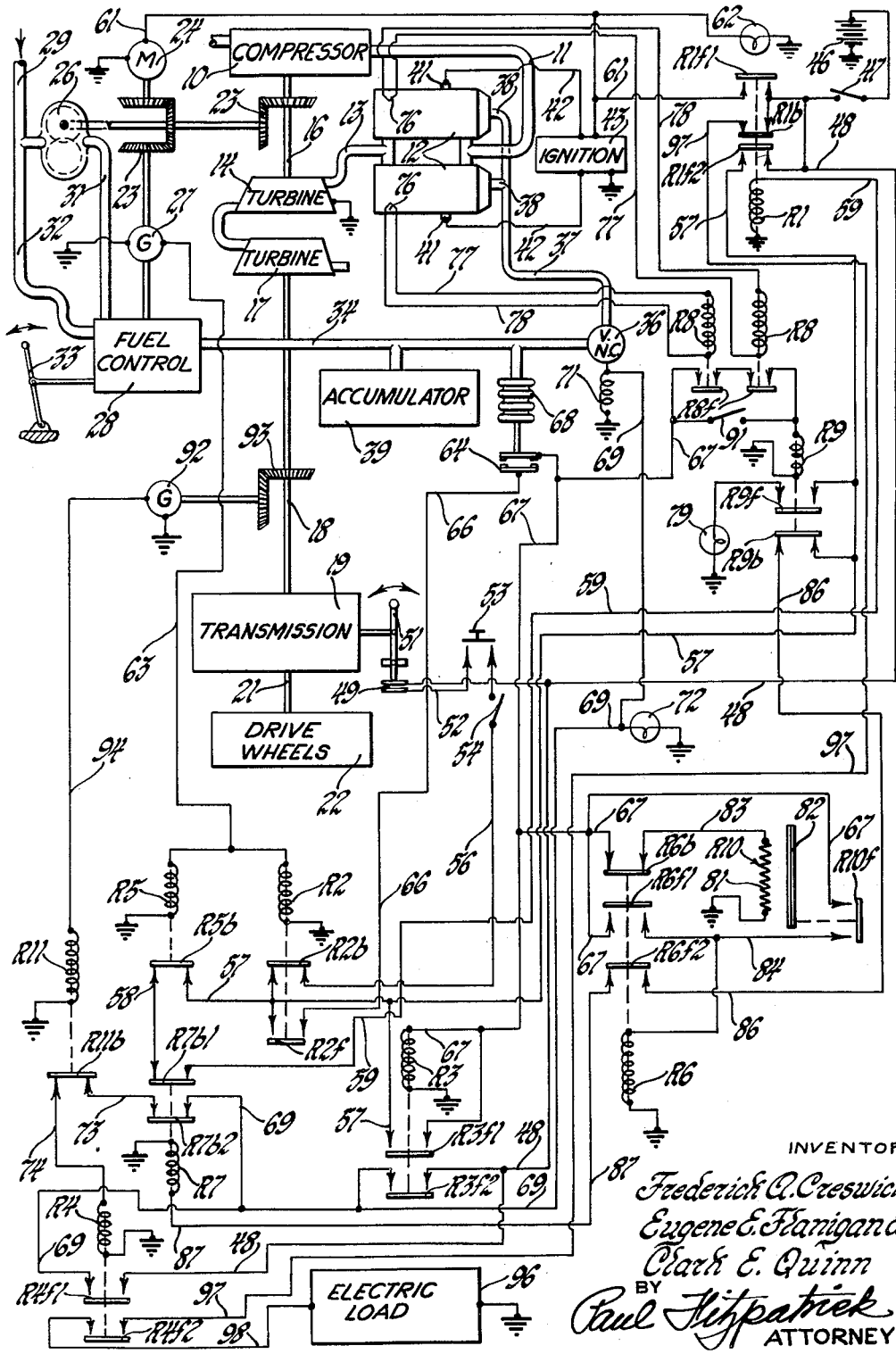

2,938,338

GAS TURBINE STARTING SYSTEM

Frederick A. Creswick and Eugene E. Flanigan, Detroit, and Clark E. Quinn, Royal Oak, Mich., assignors to General Motors Corporation, Detroit, Mich., a corporation of Delaware Filed Jan. 20, 1956, Ser. No. 560,397

1 Claim. (Cl. 60—39.14)

This invention relates to controls for engines and particularly to starting and safety controls for an automotive gas turbine engine. The invention is described herein as applied to the engine which is the subject matter of application Serial No. 559,475, filed January 16, 1956, for Automotive Gas Turbine. The principal objects of the invention are to provide control of starting and operation of an engine of this sort to safeguard against failures in starting the engine or overspeed of the engine. By virtue of the invention, the starting of the engine is made substantially automatic.

The nature of the invention and the advantages thereof will be apparent from the succeeding detailed description of the preferred embodiment of the invention and the accompanying drawing, which is a schematic diagram of the engine, its fuel system, and the control circuits therefor.

Referring first by way of background to the engine, it comprises a compressor 10 supplying compressed air through a conduit 11 to combustion chambers indicated at 12. While the engine referred to above has four combustion chambers, they are in two groups of two with cross-ignition between the two chambers of each group; each group being represented by one of the chambers 12 of the figure. Fuel is burned in the combustion chambers to provide motive fluid which is transmitted through a conduit 13 to a gas generator turbine 14 mechanically coupled through a shaft 16 to the compressor 10. Motive fluid discharged from the turbine 14 proceeds through a second or power turbine 17, which is coupled through shafting indicated at 18, an automatic transmission or gearbox 19, and shafting 21 to the drive wheels 22 of the vehicle. It will be understood that the turbines 14 and 17 are gas coupled and may rotate independently. Auxiliary drive gearing indicated as 23 couples turbine 14 to an electric starter motor 24, a fuel pump 26, a tachometer generator 27, and a speed governor included in a fuel control 28.

Pump 26 delivers fuel, received from conduit 29, through a conduit 31 to the fuel control 28 which, by mechanism immaterial to the present invention, meters the requisite quantity of fuel to the engine and returns the excess to the pump inlet through a conduit 32. The power setting of the fuel control is established by a manual or pedal control 33 which may determine the speed of turbine 14. Fuel metered by the control 28 is supplied through a conduit 34, a normally closed solenoid opened valve 36, and a conduit 37 to the fuel nozzles or fuel inlets 38 of the combustion chambers 12. A hydraulic accumulator 39 may serve to accumulate fuel before valve 36 is opened to facilitate starting the engine. Combustion is initiated by igniters or spark plugs 41 in each combustion chamber which are energized through leads 42 from an ignition generator 43.

It is to be understood that the details of structure of the engine and fuel system described above are immaterial to the present invention.

The starter motor 24, the ignition generator 43, and other electrical elements of the system are energized from a suitable electrical power source indicated as a battery 46 connected through a master switch 47 to a main power bus 48.

The circuit for initiating the starting of the engine is energized from bus 48 through a switch 49 mechanically actuated by the selector lever 51 of the transmission 19 and closed only when the selector lever is in the position which puts the transmission in neutral. Switch 49 is connected through lead 52, a manually operable starter switch 53, a lock-out switch 54, which may be key operated, lead 56, back contacts R2b of low speed relay R2, lead 57, back contacts R5b of high speed relay R5, lead 58, back contacts R7b1 of cutout relay R7, and lead 59 to the coil of a starter relay R1. The functions of R2, R5 and R7 will be described. For the present it will suffice to note that the back contacts thereof are closed when the starting cycle is initiated.

When starter relay R1 is energized, it closes its front contacts R1f1 to complete a circuit from the main bus 48 through lead 61 to the starter motor 24, the ignition generator 43, and a pilot light 62. The starter motor 24 turns over the compressor and turbine 14, the ignition generator energizes spark plugs 41, and the pilot light 62 indicates that the starter is energized. Relay R1 also closes its front contacts R1f2, completing a circuit from the main bus 48 through lead 57, contacts R5b, lead 58, contacts R7b1, and lead 59 to the coil of relay R1. This circuit shunts the transmission selector switch 49, manual starting switch 53, and lock-out switch 54 so that the starting button may be released as soon as relay R1 pulls in.

As the engine is accelerated by the starter, the voltage generated by tachometer generator 27 increases and, at approximately 4,000 r.p.m. of the turbine 14, is sufficient to energize low speed relay R2, which is connected to the generator 27 by lead 63. Relay R2 opens its back contacts R2b, thus completely inactivating the circuit from main bus 48 through the starter button 53. Low speed relay R2 also closes its front contacts R2f which, in connection with a fuel pressure switch 64, energize the coil of fuel pilot relay R3. The energizing circuit may be traced from the main bus 48 through contacts R1f2, lead 57, contacts R2f, lead 66, switch 64, and lead 67 to the coil of fuel pilot relay R3. Switch 64 is closed only when there is adequate pressure in the fuel line 34, being operated by an expansible chamber device such as the bellows 68 connected to the fuel line.

Relay R3 closes its front contacts R3f1 which connect lead 57 to lead 67, thus shunting contacts R2f and switch 64. Contacts R3f2 of relay R3 complete a circuit from the main bus 48 through lead 69 to the solenoid 71 of fuel valve 36, opening valve 36 and allowing fuel to flow to the nozzles 38 through conduit 37. A pilot light 72 indicating that the fuel valve is open is also energized from lead 69. Lead 69 is also connected through back contacts R7b2 of relay R7, lead 73, back contacts R11b of an overspeed relay R11, and lead 74 to the coil of fuel relay R4. This relay remains energized during normal operation of the engine and serves to maintain the energization of solenoid 71 of fuel valve 36. Fuel relay R4 closes its front contacts R4f1 which complete a circuit from main bus 48 to lead 69 in parallel with contacts R3f2, thus holding relay R4 and fuel solenoid 71 energized independently of the continued energization of fuel pilot relay R3.

It will be seen, therefore, that through the operation of tachometer generator 27 and relays R2, R3, and R4 the solenoid 71 is energized to allow fuel to flow to the engine as soon as it is cranked up to a speed suitable for combustion. The starter continues to aid the engine to a higher speed and the engine will accelerate to a selfsustaining speed in the normal course of events. When the turbine 14 reaches 15,000 r.p.m., the voltage generated by tachometer generator 27 is sufficient to operate high speed relay R5, which is less sensitive than low speed relay R2. Relay R5 then opens its back contacts R5b, breaking the holding circuit through contacts R1f2, lead 57, contacts R5b, lead 58, contacts R7b1, and lead 59 to relay coil R1. The deenergization of relay R1 opens its front contacts R1f1, deenergizing the starter motor 24, ignition generator 43, and pilot light 62. At this time the engine should be in normal operation.

It may be noted that the fuel pressure switch 64 is shunted by contacts R3f1 at the time the fuel solenoid 71 is energized because the opening of this valve, allowing fuel to flow into conduit 37, may temporarily create a low pressure in conduit 34 which may cause switch 64 to open momentarily. If the switch 64 were not shunted or otherwise disabled, the starting sequence would be interrupted. However, the solenoid 71 cannot be energized initially unless there is sufficient pressure in line 34 so that proper atomization of fuel in the nozzles 38 can be obtained, as indicated by the closing of switch 64. The accumulator 39 is charged by the pump 26 during the initial cranking of the engine before valve 36 is opened to provide an ample fuel burst for the light-off.

The control system of the invention provides protection against one hazard of starting, which is that one of the combustion chambers 12 might light off but not the other due to some failure of the fuel nozzle or the igniter plug. If this should happen, the condition is sensed, the starting cycle is terminated, and the fuel is shut off by apparatus to be described. A thermocouple 76 is provided in the outlet of each of the combustion chambers 12 to respond to the temperature of the gas generated by the combustion chamber. If there is no light-off, the thermocouple voltage is much lower than if flame is established. Each thermocouple 76 is connected through leads 77 and 78 to an individual thermocouple relay R8. These relays may be any suitable sensitive type relay or, if desired, might be a thermionic relay. Relays R8 operate front contacts R8f which remain open if the thermocouple voltage is low, indicating lack of combustion, and are closed if the temperature rises. Contacts R8f are connected in series between line 57 and the coil of burner relay R9 so that the burner relay is energized only if both relays R8 pull in. Combustion in both burners should of course begin while the starter is still in operation, relay R1 is energized, and the speed is over 4,000 r.p.m., so that front contacts R2f of the low speed relay are closed and fuel pressure is present to hold switch 64 closed. The energizing circuit for relay R9 may therefore be traced from the main bus 48 through contacts R1f2, lead 57, contacts R2f, lead 66, pressure switch 64, lead 67, and both sets of front contacts R8f to relay coil R9. When relay R9 is energized, it closes its front contacts R9f, energizing pilot light 79 which indicates a successful light-off of the engine. However, if one or both of the burner groups 12 fails to ignite, one or both sets of contacts R8f will remain open and relay R9 will not be energized. As a result, the starting cycle will be interrupted and the fuel will be shut off.

However, it is necessary to allow a suitable time for successful ignition, which is accomplished by a circuit, including a pilot cutout relay R6, the cutout relay R7 and a timing relay R10. When the pilot fuel relay R3 is energized by contacts R2f of the low speed relay to supply fuel to the engine, the timing relay R10 also is energized from lead 67 through the closed back contacts R6b of pilot cutout relay R6. Relay R10 is a normally open timed relay comprising a heater coil 81 and a bi-metallic element 82 heated thereby which is coupled to the front contacts R10f of the relay. The operating time delay of relay R10 is an appropriate amount, such as two seconds, to allow sufficient time for ignition. At the end of this interval, contacts R10f are closed to end the starting cycle unless the combustion chambers are operating properly.

Heater coil 81 of relay R10 is connected to lead 67 through contacts R6b and lead 83. When contacts R10f close, they complete a circuit from lead 67 through the contacts and lead 84 to the coil of pilot cutout relay R6. Relay R6 opens the energizing circuit of heater coil 81 at its back contacts R6b. Relay R6 also completes a holding circuit from lead 67 through its front contacts R6f1 to lead 84 so that it remains energized after the time delay contacts R10f open. If there has not been a normal light-off and relay R9 is deenergized, a circuit is completed from main bus 48 through front contacts R1f2, lead 57, back contacts R9b, lead 86, front contacts R6f2, and lead 87 to the coil of cutout relay R7, causing this relay to open its back contacts.

The holding circuit of starter relay R1 is opened at contacts R7b1 thus deenergizing the starter relay, the starter, and the ignition, and the holding circuit of fuel pilot relay R3. The holding circuit for fuel relay R4 from main bus 48 through its front contacts R4f1, lead 69, back contacts R7b2, lead 73, contacts R11b, and lead 74 is opened at contacts R7b2 when cutout relay R7 is energized. Relay R4, being thus deenergized, opens its front contacts R4f1 which energize fuel solenoid 71. As a result, the fuel is shut off. With the fuel and the starter shut off, the engine will coast to a stop.

If the burners have lit off during the two seconds time interval, contacts R8f will be closed and relay R9 will be energized so that the energizing circuit of cutout relay R7 will be open at contacts R9b. After the starting cycle has been completed and relay R1 has been deenergized, the burner relay R9 is ineffectual since there is no current supply through contacts R1f2 and lead 57 to the contacts operated by the relay.

Contacts R8f of the thermocouple relays are shunted by a manually operable switch 91 which may be closed if there should be a failure of one of the thermocouples 76 or relays R8 so that the engine can be started under these conditions. Since the circuit by which starter relay R1 is energized from the starter switch 53 is made through back contacts R2b of the low speed relay, the starting cycle cannot be initiated after a failure to start until the engine speed drops below 4,000 r.p.m.

The speed of the gasifier turbine 14 is controlled by a governor incorporated in the fuel control 28. The electrical system provides protection against overspeed of the power turbine 17 which might occur under certain conditions, such as advancing the power control with the transmission in neutral, or if the vehicle wheels are on an icy surface. This is effected by a tachometer generator 92 coupled through gearing indicated at 93 to the shaft 18 of the power turbine. Generator 92 energizes overspeed relay R11 through a lead 94. Since the back contacts R11b of this relay are in the holding circuit for fuel relay R4, any overspeed of the power turbine will deenergize R4 and thereby cause the fuel control valve 36 to be closed by means of the circuits previously described.

The control system performs another function in that it prevents imposition of heavy loads in the vehicle on the power source 46 when the starter is energized or when the engine is not operating. Such electrical loads might, for example, be air conditioning blowers or other devices in a vehicle which require large current. Since the nature of these devices is immaterial, they are represented by the rectangle 96. Power is supplied to the electric load devices 96 from the main bus 48 through back contacts R1b of starter relay R1, lead 97, front contacts R4f2 of the fuel relay R4, and lead 98. This circuit is broken by the starter relay R1 when that relay is energized to operate the engine starter and is also broken whenever fuel relay R4 is deenergized.

It will be apparent from the foregoing description of the system and its operation that it provides for automatic starting of the engine after closing of the starter switch 53 which is timed and supervised so that, unless both combustion chambers ignite promptly, the starting cycle is terminated. The engine is protected against overspeed and the battery is protected against overload during the starting cycle or when the engine has cut out.

The detailed description herein of the preferred embodiment of the invention for the purpose of explaining the principles thereof is not to be construed as limiting the invention, as many modifications may be made by the exercise of skill in the art within the scope of the invention.

We claim:

A control system for a gas turbine engine comprising a compressor, combustion apparatus, a turbine, a starter, and means for supplying fuel to the combustion apparatus; the system comprising, in combination, a fuel shutoff valve, means operable to open the shutoff valve, a first conduit connecting the fuel supplying means to the shutoff valve, a second conduit connecting the shutoff valve to the combustion apparatus, means responsive to the pressure in the first conduit actuated when the pressure reaches a predetermined value, means responsive to speed of the turbine actuated when the speed reaches a predetermined value, relay means actuated jointly by the pressure responsive and speed responsive means when the speed and pressure reach the said predetermined values, means actuated by the relay means operative to hold the relay means actuated independently of the pressure responsive means, and means actuated by the relay means connected to the shutoff valve operating means operable to open the shutoff valve when the relay means is actuated.

References Cited in the file of this patent
UNITED STATES PATENTS

| | | |
|---|---|---|
| 2,123,133 | Callsen | July 5, 1938 |
| 2,283,785 | Boling | May 19, 1942 |
| 2,449,338 | Summersett | Sept. 14, 1948 |
| 2,486,612 | Pratt | Nov. 1, 1949 |
| 2,497,792 | Poznik | Feb. 14, 1950 |
| 2,617,253 | Fusner et al. | Nov. 11, 1952 |
| 2,651,911 | Sterland | Sept. 15, 1953 |
| 2,667,742 | Kuzmitz | Feb. 2, 1954 |
| 2,715,313 | Fleming et al. | Aug. 16, 1955 |
| 2,807,138 | Torell | Sept. 24, 1957 |
| 2,808,702 | Dotson | Oct. 8, 1957 |

(Dup. French No. 1,054,998, Oct. 14, 1953)

FOREIGN PATENTS

| | | |
|---|---|---|
| 155,773 | Australia | Mar. 19, 1954 |
| 1,054,998 | France | Oct. 14, 1953 |

(Dup. British No. 745,719)